(12) United States Patent
Okamoto et al.

(10) Patent No.: US 7,236,215 B2
(45) Date of Patent: Jun. 26, 2007

(54) LIQUID CRYSTAL DISPLAY DEVICE HAVING SMALL PICTURE FRAME REGION

(75) Inventors: Kazuhiro Okamoto, Kawasaki (JP);
Shinpei Nagatani, Kawasaki (JP);
Takayuki Eiraku, Kawasaki (JP);
Hiroyoshi Takahashi, Kawasaki (JP);
Seiji Hayashimoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/867,082

(22) Filed: May 29, 2001

(65) Prior Publication Data

US 2001/0050732 A1    Dec. 13, 2001

(30) Foreign Application Priority Data

Jun. 9, 2000    (JP) ............... 2000-173981

(51) Int. Cl.
*G02F 1/1333* (2006.01)

(52) U.S. Cl. .......................... 349/58; 349/59

(58) Field of Classification Search ............. 349/58, 349/59; 361/681–683
See application file for complete search history.

(56) References Cited

U.S. PATENT DOCUMENTS

| | | | | |
|---|---|---|---|---|
| 5,831,696 A | * | 11/1998 | Sheng ..................... | 348/58 |
| 5,835,139 A | * | 11/1998 | Yun et al. ................ | 349/58 |
| 5,915,658 A | * | 6/1999 | Sheng ................. | 248/346.06 |
| 5,926,237 A | * | 7/1999 | Yun et al. ................ | 349/58 |
| 6,002,457 A | * | 12/1999 | Yun et al. ................ | 349/58 |
| 6,020,942 A | | 2/2000 | Yun et al. | |
| 6,024,335 A | * | 2/2000 | Min ......................... | 248/371 |
| 6,094,340 A | * | 7/2000 | Min ......................... | 361/681 |
| 6,104,451 A | * | 8/2000 | Matsuoka et al. .......... | 349/58 |
| 6,216,989 B1 | * | 4/2001 | Shioya et al. .......... | 248/122.1 |
| 6,373,537 B2 | * | 4/2002 | Yun et al. ................ | 349/58 |
| 6,417,897 B1 | * | 7/2002 | Hashimoto ................ | 349/65 |
| 6,498,718 B1 | * | 12/2002 | Kim et al. ................ | 361/680 |
| 2002/0039154 A1 | * | 4/2002 | Miwa ....................... | 348/58 |
| 2002/0053629 A1 | * | 5/2002 | Hokugoh ................. | 248/371 |
| 2002/0080299 A1 | * | 6/2002 | Yun et al. ................ | 349/58 |

FOREIGN PATENT DOCUMENTS

| | | | | |
|---|---|---|---|---|
| JP | 11085319 A | | | 3/1989 |
| JP | 7-56516 | * | | 3/1995 |
| JP | 07056516 A | | | 3/1995 |
| JP | 11006998 A | | | 1/1998 |
| JP | 10282899 A | | | 10/1998 |
| JP | 11-202787 | * | | 7/1999 |
| JP | 11202787 A | | | 7/1999 |
| JP | 11-259011 | * | | 9/1999 |
| JP | 11259011 A | | | 9/1999 |
| JP | 2000-47209 | * | | 2/2000 |
| JP | 2000047209 A | | | 2/2000 |

* cited by examiner

*Primary Examiner*—Mike Qi
(74) *Attorney, Agent, or Firm*—Greer, Burns & Crain, Ltd.

(57) ABSTRACT

A liquid crystal display device has a framework which includes a first frame for supporting a liquid crystal panel, a second frame having an upper portion for covering a peripheral portion of the surface of the liquid crystal panel and a side extending substantially parallel to the side of the first frame, and third members being in the form of clips detachably attached to the side of the first frame. The second frame is fixed to the first frame via the third members. The liquid crystal display device also includes a mechanism for changing the angle of the display.

9 Claims, 10 Drawing Sheets

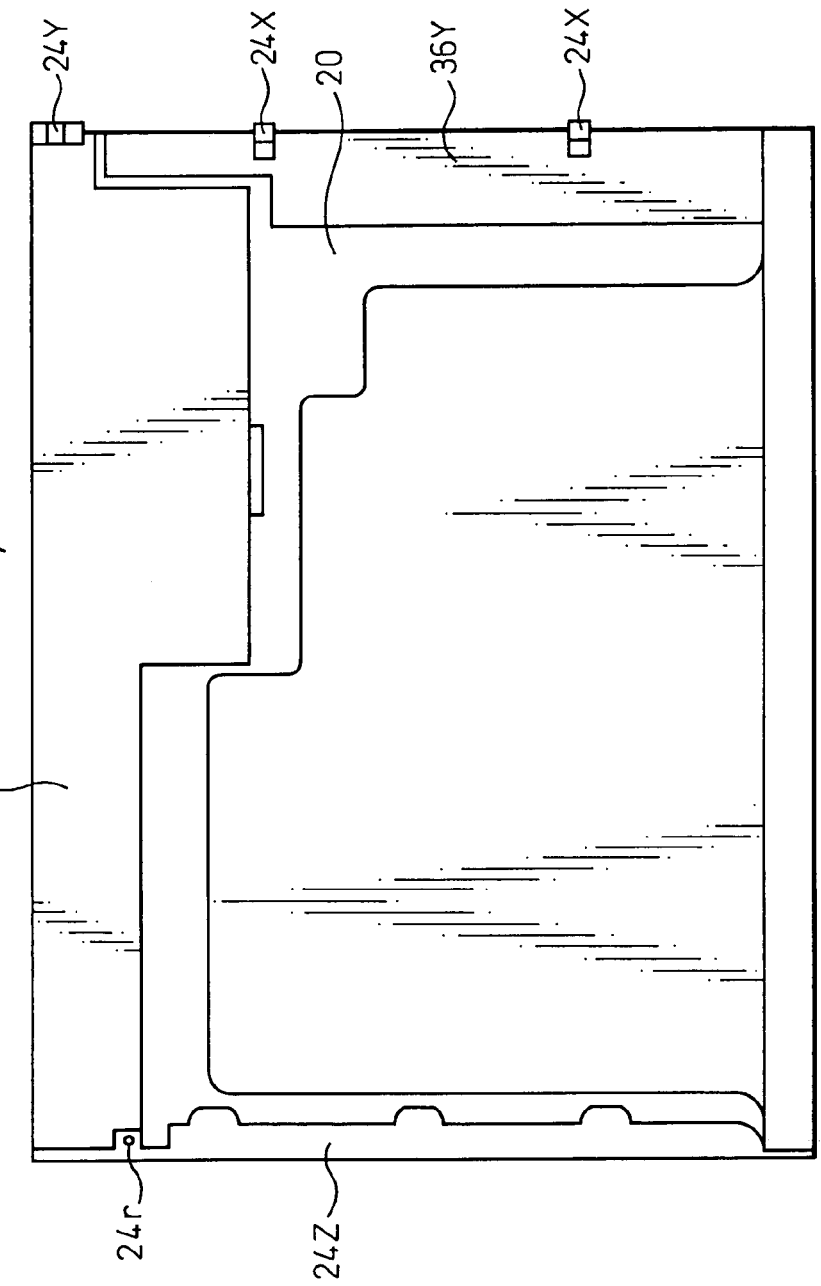

LIQUID CRYSTAL DISPLAY DEVICE HAVING SMALL PICTURE FRAME REGION

BACKGROUND OF THE INVENTION

1. Field of the Invention

The present invention relates to a liquid crystal display.

2. Description of the Related Art

Recently, liquid crystal display devices have been widely used in a portable-type information devices. Accordingly, there is a strong demand for reducing the weight, the thickness and the length of the liquid crystal display device. Therefore, it is required that the area of a picture frame region (portion outside the image forming region) of the liquid crystal display device is further decreased.

The liquid crystal display device includes a liquid crystal panel, which is supported by a panel frame. The liquid crystal display device sometimes includes a liquid crystal panel and a light source unit such as a backlight, and the liquid crystal panel and the light source unit are integrally supported by the frame as a liquid crystal display unit. The above frame comprises a first frame for supporting a bottom portion of the liquid crystal panel and a second frame covering an upper peripheral portion of the liquid crystal panel and fitted on the first frame. The second frame is fixed to the first frame by means of screws. The first and second frames are formed into a substantially rectangular profile.

In order to fix the second frame to the first frame, both the first and second frames include flanges protruding outside the rectangular profile, and these flanges are overlapped one on another and connected to each other by screws extending perpendicular to the display surface. The above structure is described, for example, in Japanese Unexamined Patent Publications No. 11-202787 and No. 2000-47209. However, in the above structure, since the flanges are provided, it is impossible to reduce the area of the picture frame region of the liquid crystal display device.

Therefore, holes (threaded holes) are provided in the fitting regions (the side of the second frame and the side of the first frame) in which the second frame is fitted on the first frame, and the fitting regions are fixed by screws extending parallel to the display surface. The above structure is described, for example, in Japanese Unexamined Patents Publication No. 10-282899 (U.S. Pat. No. 5,926,237, No. 5,835,139 and No. 6,002,457) and Japanese Unexamined Patent Publications No. 11-6998 and No. 11-85319. However, when the above structure is adopted, the following problems may be encountered. It is difficult to form threaded holes at accurate positions in the first frame made of resin. Especially, when the threaded holes are formed in a resin member, in many cases, metallic members having threaded holes are insert-molded in resin. In this case, it is difficult to form threaded holes at accurate positions.

Also, with an increasing demand for a liquid crystal display device, a self-standing type liquid crystal display device is increasingly supplied. The self-standing type liquid crystal display device is described, for example, in Japanese Unexamined Patent publication No. 7-56516 and No. 11-259011. In a conventional self-standing type liquid crystal display device, the display device such as a liquid crystal display device is arranged in a housing, and the self-standing device including a tilt mechanism is attached to the housing. For the above reasons, it is necessary that the housing is formed into a structure in which the self-standing device including a tilt mechanism can be suitably attached to the housing. However, in the case of a compact liquid crystal display device, it is impossible to provide such a housing. In this case, a chassis is attached to a frame for supporting the display unit, and the tilt mechanism is attached to the chassis.

SUMMARY OF THE INVENTION

An object of the present invention is to provide a liquid crystal display device, in which a picture frame region is small.

A liquid crystal display device according to the present invention comprises a first frame for supporting a liquid crystal panel, the first frame having a side, a second frame having an upper portion covering a portion of a surface of the liquid crystal panel and a side extending substantially parallel to the side of the first frame, the side of the second frame having a connecting section and at least one third member detachably attached to the side of the first frame and having a connecting section connected to the connecting section of the side of the second frame.

According to the above structure, it is possible to reduce the area of the picture frame region (portion outside an image forming region) of the liquid crystal display.

BRIEF DESCRIPTION OF THE DRAWINGS

The present invention will become more apparent from the following description of the preferred embodiments, with reference to the accompanying drawings, in which:

FIG. 8 is a bottom view of the liquid crystal display device, according to a modification of the liquid crystal display shown in FIGS. 1 to 4, viewed from the first frame;

DESCRIPTION OF THE PREFERRED EMBODIMENTS

Referring to the appended drawings, the preferred embodiments of the present invention will be explained below.

Figure 1:
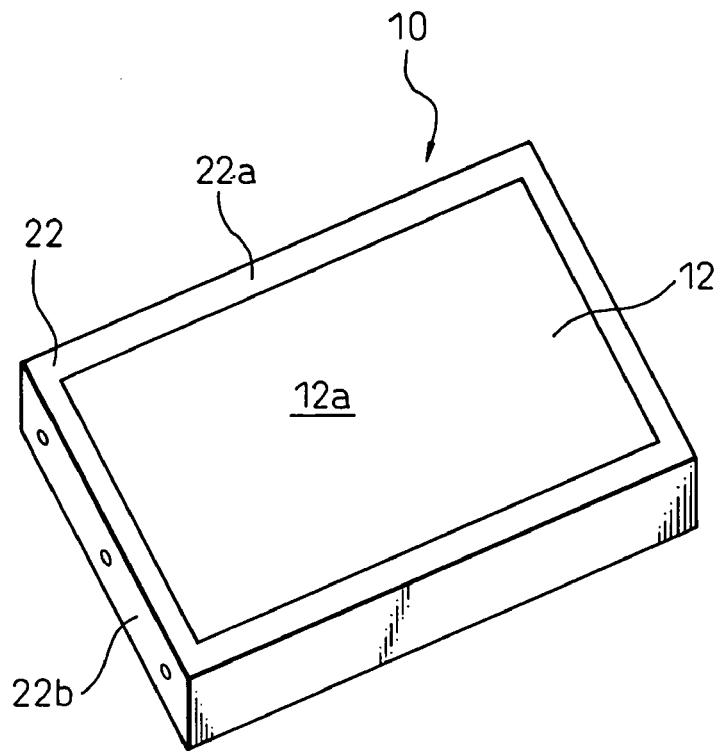
FIG. 1 is a perspective view showing a liquid crystal display of the first embodiment of the present invention.
Figure 2:
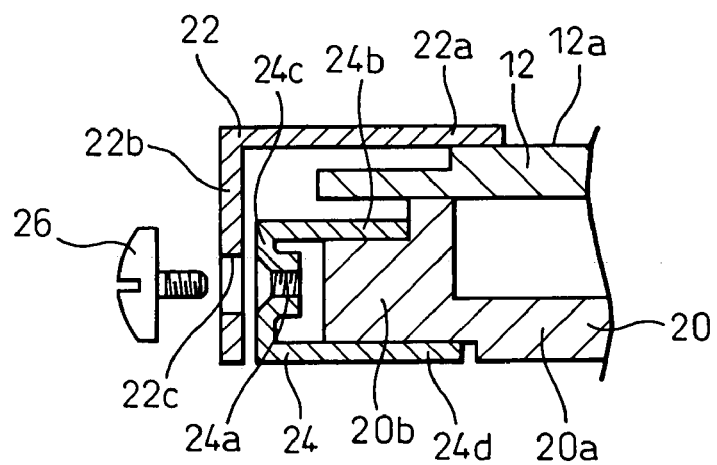
FIG. 2 is a partial cross-sectional view of the liquid crystal display shown FIG. 1.
Figure 5:
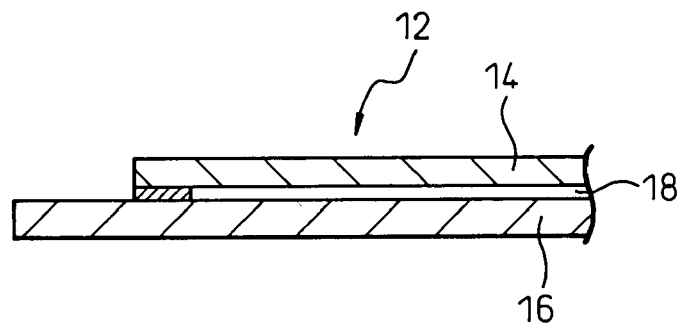
FIG. 5 is a view showing a structure of a liquid crystal panel.

FIG. 1 is a perspective view showing a liquid crystal display device 10 of the first embodiment of the present invention. FIG. 2 is a partial cross-sectional view of the liquid crystal display device 10 shown in FIG. 1. The liquid crystal display device 10 includes a liquid crystal panel 12. As shown in FIG. 5, the liquid crystal panel 12 comprises a liquid crystal 18 inserted between a pair of glass substrates 14 and 16. Alignment films and electrodes (not shown) are provided on the inner sides of the glass substrates 14 and 16, and polarizers (not shown) are provided on the outer sides of the glass substrates 14 and 16.

In FIGS. 1 and 2, the liquid crystal display device 10 includes a first frame 20, a second frame 22 and a third member 24. The first frame 20 and the second frame 22 respectively have rectangular annular outer shapes. The second frame 22 is fitted on the first frame 20.

The first frame 20 has a bottom 20a and side 20b for supporting the liquid crystal panel 12. An upper surface of the side 20b is formed stepwise, and the liquid crystal panel 12 is supported by a higher step surface on the inner side of the upper surface of the side 10b. The second frame 22 includes a top 22a covering a portion of the surface of the liquid crystal panel 12, and a side 22b extending substantially in parallel to the side 20b of the first frame 20. A portion of the liquid crystal panel 12, which is exposed from the second frame 22, provides a display region 12a. The second frame 22 is connected to the first frame 20 at a pair of opposite sides 22b, the side 22b having a connecting section 22c.

The third member 24 is detachably attached to the side 20a of the first frame 20. The third member 24 has a connecting section 24a connected to the connecting section 22c of the side 22b of the second frame 22. The connecting section 22c of the side 22b of the second frame 22 is formed as a through-hole, and the connecting section 24a of third member 24 is formed as a threaded hole. Therefore, a screw 26 is inserted through the connecting section 22c and screwed into the connecting section 24a. Since the third member 24 is fixed to the side 20a of the first frame 20, the second frame 22 is fixed to the first frame 20 via the third member 24.

The third member 24 includes a first wall 24b contacting an upper surface (a lower step face) of the side 20b of the first frame 20, a second wall 24c facing the side 22b of the second frame 22, and a third wall 24d contacting a bottom surface of the first frame 20. The first wall 24b and the third wall 24d extend parallel to each other, and the second wall 24c is arranged in an intermediate section between the first wall 24b and the third wall 24d so that the first wall 24b and the third wall 24d are connected to each other by the second wall 24c. The connecting section 24a of the third member 24 comprises a threaded hole provided in the second wall 24c.

The third member 24 functions as a clip, so that the first wall 24b and the third wall 24d elastically hold the first frame 20 (the side 20b of the first frame 20) therebetween. Accordingly, the third member 24 can be easily attached to the first frame 20. Also, the third member 24 can be easily detached from the first frame 20.

Figure 7A:
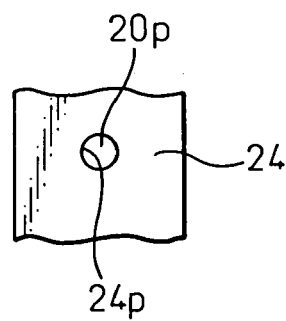
FIG. 7A is a view showing a circular hole of the third member and a protrusion of the first frame.

As shown in FIG. 7A, it is preferable that a protrusion 20p is formed on the bottom or the top of the first frame 20 and that a circular hole 24p is formed in the first wall 24b or the third wall 24d of the third member 24. Accordingly, when the third member 24 is attached to the first frame 20, the protrusion 20p is engaged in the circular hole 24p. Due to the foregoing, the third member 24 can be accurately positioned with respect to the first frame 20, and further the third member 24 can be positively fixed to the first frame 20.

Figure 7B:
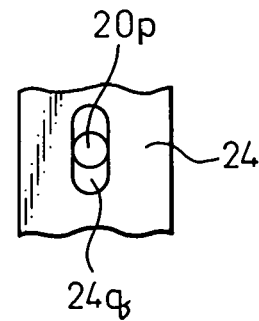
FIG. 7B is a view showing a long hole of the third member and a protrusion of the first frame.

As shown in FIG. 7B, which shows a modification of FIG. 7A, a protrusion 20p is formed on the bottom or the top of the first frame 20, and a long hole 24q is formed in the first wall 24b or the third wall 24d of the third member 24. In this case, the long hole 24q is formed extending in the direction parallel to the side surface of the first frame 20. Accordingly, when the third member 24 is attached to the first frame 20, the protrusion 20p is engaged in the long hole 24q, and the third member 24 can be slid with respect to the first frame 20 in a range of the long hole 24q. In this way, the position of the third member 24 can be adjusted.

This liquid crystal display device 10 can be used as it is. Alternatively, it is possible to attach this liquid crystal display device 10 to a casing or a housing of a portable type information apparatus so that the portable type information apparatus can be assembled. In the latter case, the side 22b of the second frame 22 can be provided with simple holes or screw holes used for attaching the liquid crystal display device to a casing or a housing of the portable type information apparatus.

Figure 3:
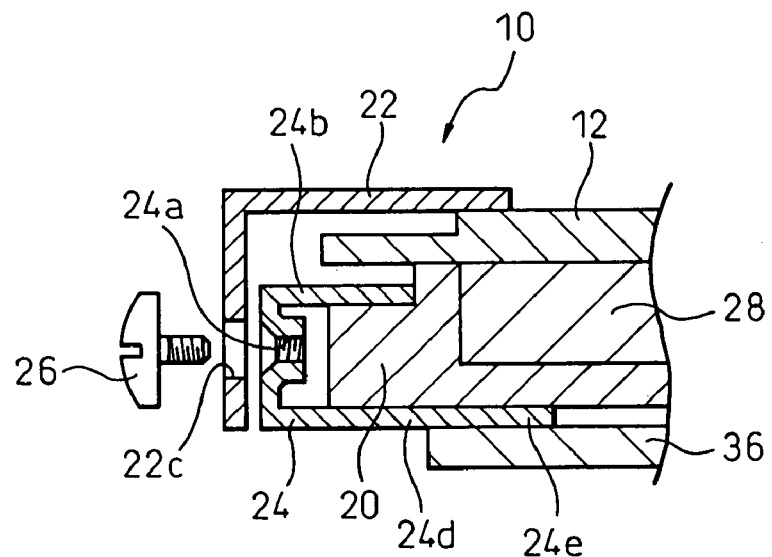
FIG. 3 is a view showing a modification of the liquid crystal display shown in FIGS. 1 and 2.
Figure 4:
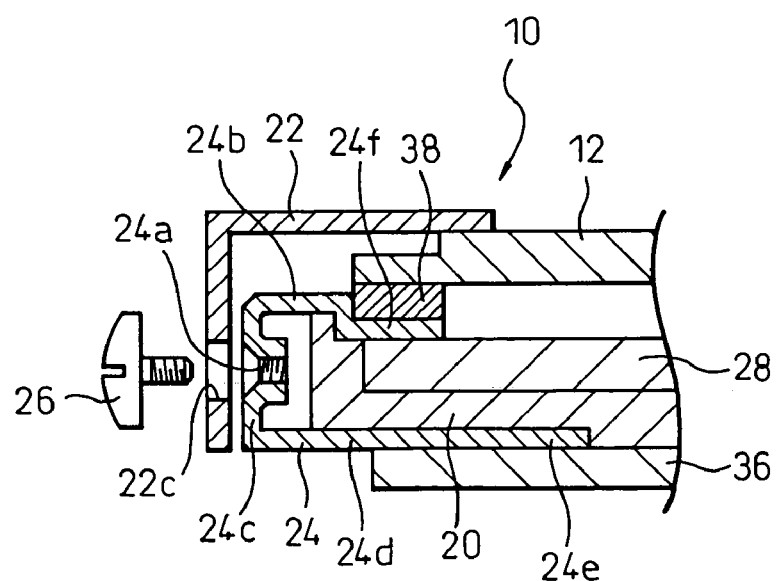
FIG. 4 is a view showing a modification of the liquid crystal display shown in FIGS. 1 and 2.

FIGS. 3 and 4 are views showing modifications of the liquid crystal display device 10 illustrated in FIGS. 1 and 2. The liquid crystal display device 10 shown in FIG. 3 includes identical members to those of the liquid crystal display device 10 shown in FIGS. 1 and 2, and further, a light source unit (backlight) 28 is added to the liquid crystal display device 10 shown in FIGS. 1 and 2. The first frame 24 supports the light source unit 28 and the liquid crystal panel 12.

Figure 6:
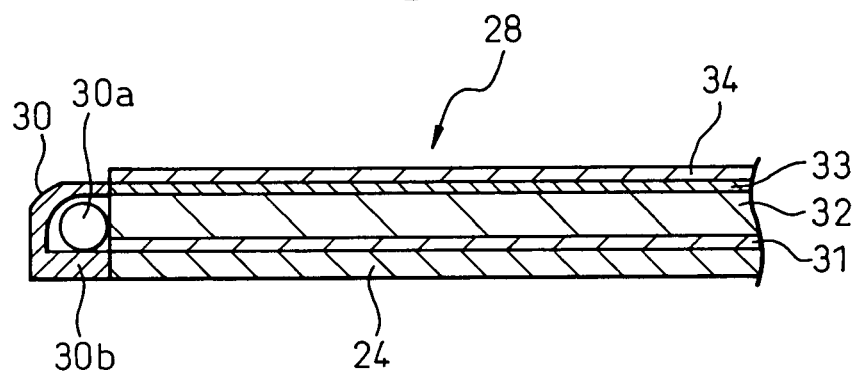
FIG. 6 is a view showing a structure of a backlight.

FIG. 6 is a view showing an example of the light source unit 28. The light source unit 28 includes a light source 30 comprising a lamp 30a and a reflector 30b, a light guide plate 32, a reflecting plate 31, and optical sheets 33 and 34 made of transparent resin. A ray of light emitted from the light source 30 enters the light guide plate 32 and proceeds in the light guide plate 32, while being totally reflected. When the ray of light proceeding in the light guide plate 32 is made incident to the reflecting plate 31, it is scattered, and a portion of the ray of light emerges from the upper surface of the light guide plate 32. The ray of light, which emerges from the light guide plate 32, passes through the optical sheets 33 and 34 and illuminates the liquid crystal panel 12. A large number of dots are formed on the reflecting plate 31. The optical sheets 33 and 34 provide an effect that the dots cannot be seen through the thin liquid crystal panel 12. Further, the optical sheets 33 and 34 promote the scattering of light.

The third member 24 is also provided with a tongue piece 24e extending from the third wall 24d. A circuit board 36 for driving the liquid crystal panel 12 is attached to the first frame 20. A ground portion of the circuit board 36 for driving the liquid crystal panel is electrically connected to the tongue piece 24e of the third member 24. The ground portion of the circuit board 36 comprises an electric conductor. The first frame 20 is made of resin, the second frame 22 is made of metal, and the third frame 24 is made of metal.

In this case, the ground portion (electric conductor portion) is attached to the first frame 20, and the third member 24 electrically connects the ground portion (electric conductor portion) to the second frame 22. Accordingly, the second frame 22 is also connected to the ground.

The liquid crystal display 10 shown in FIG. 4 includes members identical to those of the liquid crystal display 10 shown in FIG. 3. In this embodiment, the third member 24 has a tongue piece 24*f* for fixing at least one of the optical sheet and the optical module. In this case, the light source 30, light guide plate 32 and reflecting plate 34 are referred to as an optical module. The optical sheets 33 and 34 made of transparent resin are referred to as optical sheets. Due to the foregoing, the optical unit can be more positively fixed. The liquid crystal panel 12 is supported on the tongue piece 24*f* via a buffer 38. In this connection, the buffer 38 may be provided in other embodiments.

FIGS. 8 to 13 are views showing a modification of the liquid crystal display device 10 illustrated in FIGS. 1 to 4. The liquid crystal display device 10 includes a liquid crystal panel 12, a light source unit 28, a first frame 20, a second frame 22 and a third member 24.

FIG. 8 is a bottom view of the liquid crystal display device 10, wherein the view is taken from the first frame 20 side which supports the light source unit 28 and the liquid crystal panel 12. Two circuit boards 36X and 36Y for driving the liquid crystal panel are attached to the bottom surface of the first frame 20. The circuit boards 36X and 36Y for driving the liquid crystal panel are respectively provided with ground portions.

The third members 24X of the first type and the third member 24Y of the second type are attached to one side of the first frame 20, and the third member 24Z of the third type is attached to one side of the first frame 20. The functions of the third members 24X, 24Y and 24Z are the same as the function of the third member 24 of the embodiment described above.

Figure 9:
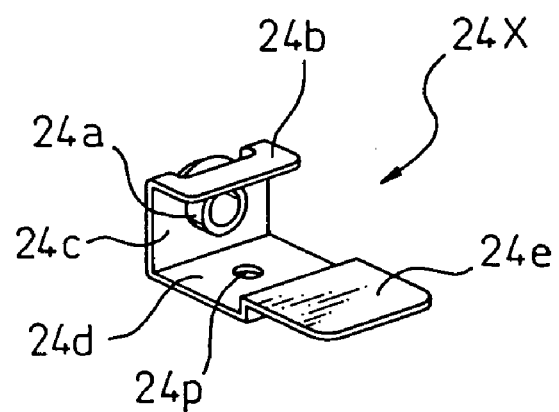
FIG. 9 is a perspective view showing the third member of the first type.
Figure 10:
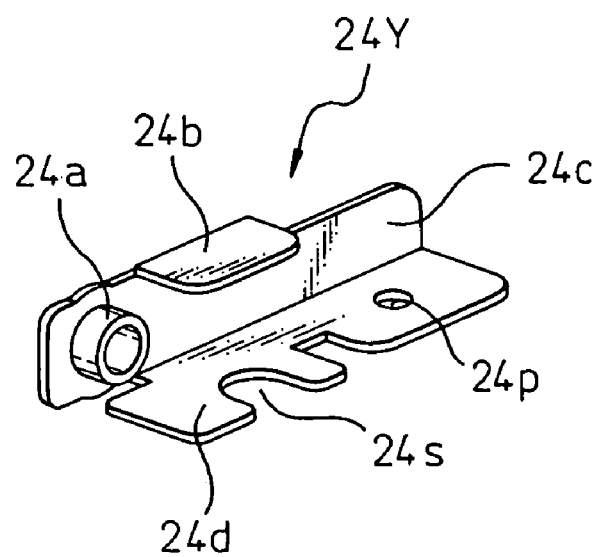
FIG. 10 is a perspective view showing the third member of the second type.

FIG. 9 is a perspective view showing the third member 24X of the first type, and FIG. 10 is a perspective view showing the third member 24Y of the second type. In the same manner as that of the third member 24 described above, the third member 24X of the first type and the third member 24Y of the second type respectively include first walls 24*b*, second walls 24*c*, third walls 24*d*, connecting sections 24*a* comprising threaded holes provided in the second walls 24*c*, and circular holes 24*p* for fixing. The third member 24X of the first type further includes a tongue piece 24*e* extending from the third wall 24*d*.

Figure 11:
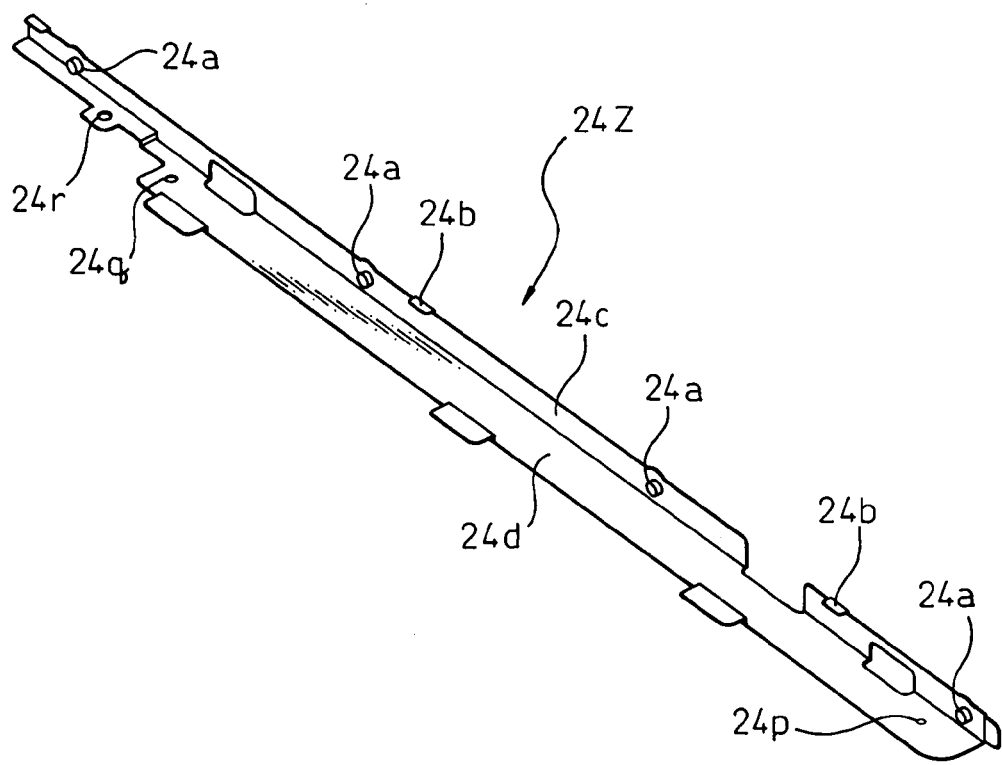
FIG. 11 is a perspective view showing the third member of the third type.

FIG. 11 is a perspective view showing the third member 24Z of the third type. The third member 24Z of the third type has essentially the same structure as that of the third member 24X of the first type and the third member 24Y of the second type, but the third member 24Z of the third type is longer than the third member 24X of the first type and the third member 24Y of the second type, and has a plurality of connecting sections 24*a*, which are composed of threaded holes. The third member 24Z of the third type has a circular hole 24*p* for fixing and a long hole 24*q*. Further, the third member 24Z of the third type has a hole 24*r* on the extension of the third wall 24*d*. The hole 24*r* is also shown in FIG. 8. A screw to fix the circuit board 36X for driving the liquid crystal panel to the first frame 20 is inserted into the hole 24*r*. A similar screw passes through a cut-out 24*s* of the third member 24Y of the second type.

Figure 12:
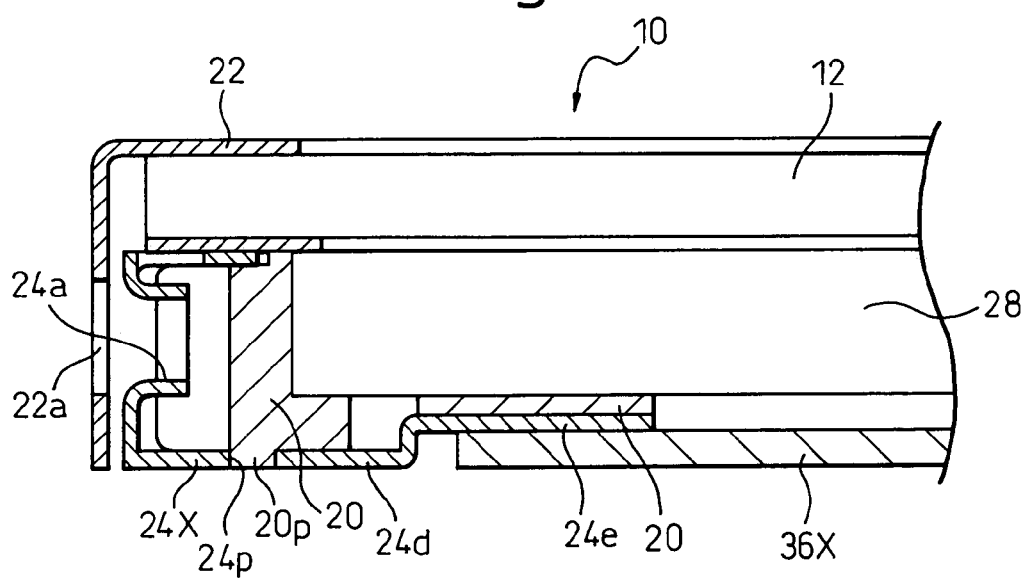
FIG. 12 is a cross-sectional view of the liquid crystal display device including the third member of the first type.
Figure 13:
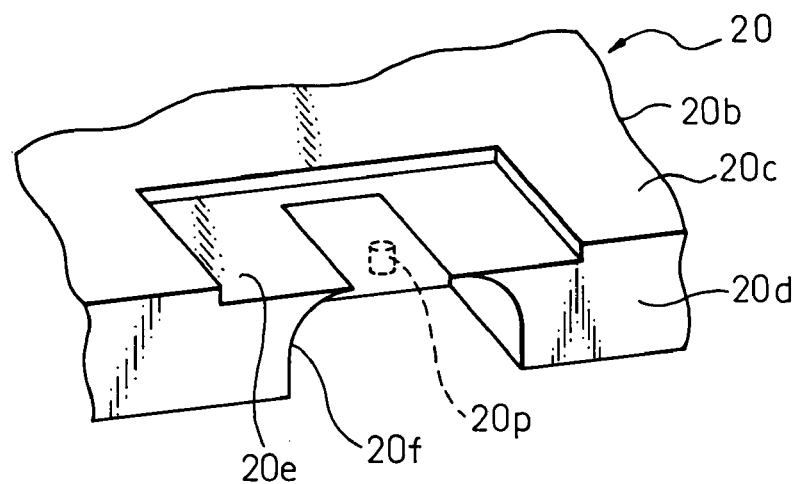
FIG. 13 is a perspective view showing a portion of the first frame to which the third member of the first type is attached.

FIG. 12 is a cross-sectional view showing a liquid crystal display device including the third member 24X of the first type. FIG. 13 is a perspective view showing a portion of the side 20*b* of the first frame 20 to which the third member 24X of the first type is attached. The essential structure of the liquid crystal display device 10 shown in FIG. 12 is the same as that of the liquid crystal display 10 shown in FIG. 3. However, in FIG. 12, the protrusion 20*p* and the circular hole 24*p* are shown, and the tongue piece 24*e* extending from the third wall 24*d* of the third member 24X of the first type is arranged in such a manner that the tongue piece 24*e* is interposed between the bottom portion of the first frame 20 and the circuit board 36X for driving the liquid crystal panel. The tongue piece 24*e* is formed stepwise being continued to the third wall 24*d*.

As shown in FIG. 13, the side 20*b* of the first frame has an upper surface 20*c* and a side surface 20*d*. The upper surface 20*c* has a recess 20*e*, and the side surface 20*d* has a recess 20*f*. The first wall 24*b* of the third member 24X of the first type is put on the surface of the recess 20*e* of the upper surface 20*c*. The first wall 24*b* has an area a little larger than the area of the recess 20*e* of the upper surface 20*c*.

As shown in FIG. 9, the connecting section 24*a* having a threaded hole protrudes from the second wall 24*c* of the third member 24X of the first type. When the first wall 24*b* is put on the surface of the recess 20*e* of the upper surface 20*c* and further the second wall 24*c* contacts the side surface 20*d*, the connecting section 24*a* having a threaded hole enters the recess 20*f* in the side surface 20*d*, so that the length of the connecting section 24*a* having the threaded hole can be absorbed in the process of assembling. Therefore, it cannot be a factor to increase the size of the picture frame of the liquid crystal display device. In the same manner, when the screw (shown in FIG. 2) is screwed into the threaded hole of the connecting section 24*a*, at least a forward end of the screw 26 enters the recess 20*f* in the side surface 20*d*.

Consequently, according to the present invention, it is possible to realize a liquid crystal display device of which the picture frame region is small.

Figure 14:
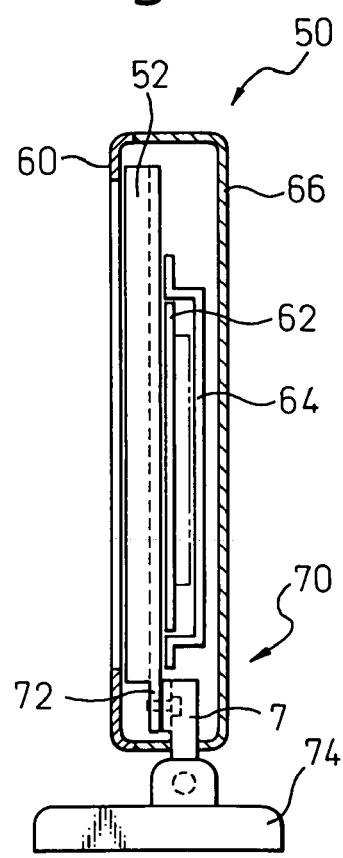
FIG. 14 is a perspective view showing a liquid crystal display device of the second embodiment of the present invention.
Figure 15:
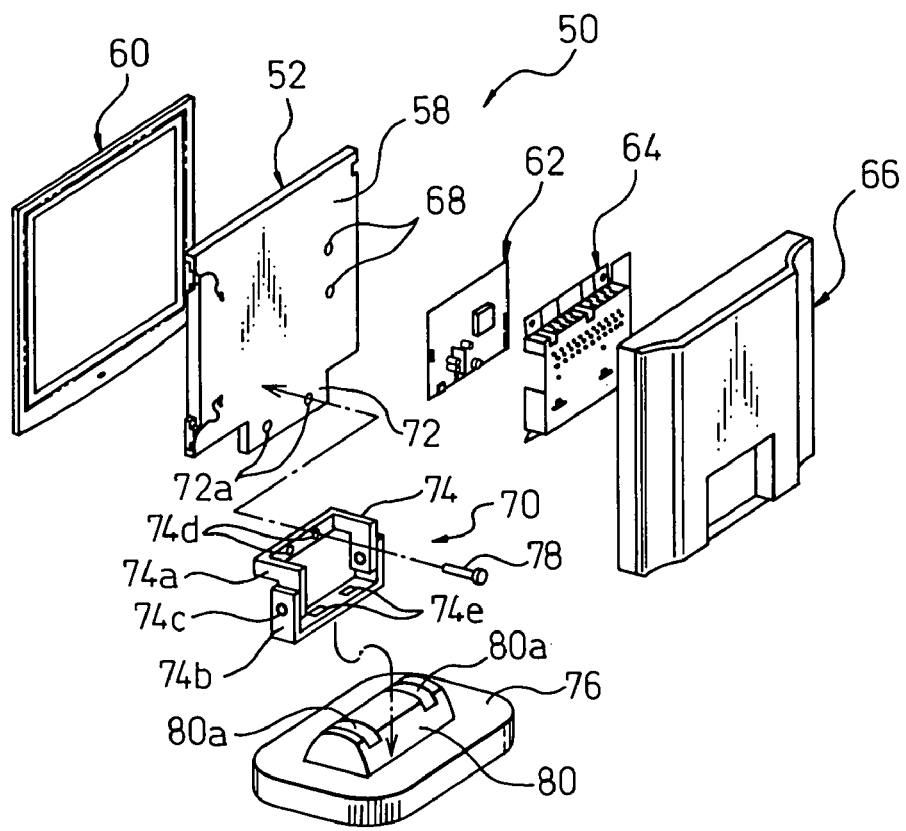
FIG. 15 is an exploded perspective view of the liquid crystal display device shown in FIG. 14.

FIGS. 14 to 20 are views showing a liquid crystal display device 50 of the second embodiment of the present invention. FIG. 15 is an exploded perspective view of the liquid crystal display device 50 shown in FIG. 14. The liquid crystal display 50 is constructed as a self-standing type liquid crystal display device. The liquid crystal display device 50 includes a liquid crystal display unit 52 and an angle changing mechanism 70 capable of changing an angle of the display easily.

Figure 16:
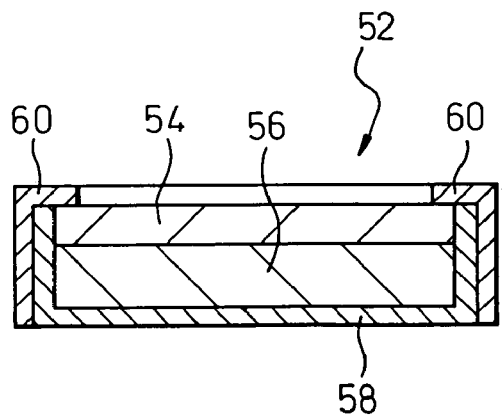
FIG. 16 is a cross-sectional view showing the liquid crystal display unit.

FIG. 16 is a cross-sectional view showing the liquid crystal display unit 52. The liquid crystal display unit 52 includes a liquid crystal panel 54, a light source unit 56, and a frame 58 to support the liquid crystal panel 54 and the light source unit 56 as a liquid crystal display unit. The liquid crystal panel 54 is similar to that explained with reference to FIG. 5, and the light source unit 56 is similar to that explained with reference to FIG. 6. The frame 58 is similar to the first frame of the embodiment described before. However, in this embodiment, the frame 58 is preferably made of metal.

A front cover 60 is attached to the front side of the frame 58. The front cover 60 is similar to the second frame 22 of the embodiment described before. In this embodiment, the front cover 60 may be fixed to the frame 58 by the third member 24 in the same manner as that of the embodiment described before, but the front cover 60 may be fixed to the frame 58 by other methods.

A circuit board 62 for driving the liquid crystal panel is attached to the back side of the frame 58 and covered by a shield cover 64. Further, a rear cover 66 is attached to the rear side of the frame 58. Accordingly, the frame 58 is provided with connecting sections 68 for attaching the circuit board 62 for driving the liquid crystal panel thereto. The connecting sections 68 comprise, for example, threaded holes for receiving screws.

Figure 17:
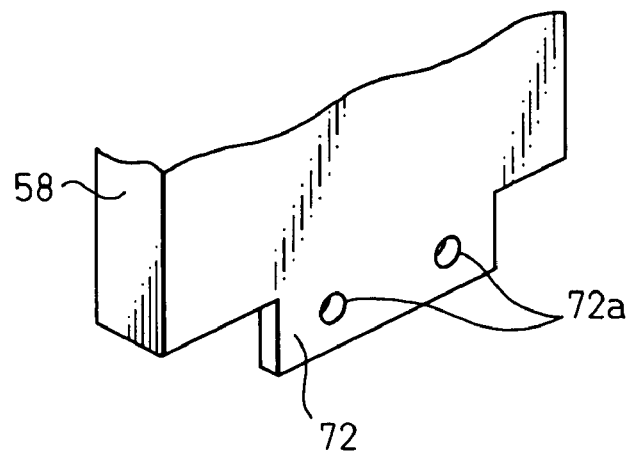
FIG. 17 is a perspective view showing a portion of the frame of the liquid crystal display unit shown in FIG. 14.

An angle changing mechanism 70 capable of changing an angle of the display of the liquid crystal panel is attached to the frame 58. Therefore, an attaching section 72 for attaching the angle changing mechanism 70 is provided in the lower extension portion of the frame 58. FIG. 17 is a view showing the frame 58 having the attaching section 72. The attaching section 72 is arranged at a position distant from the light source unit 56. The attaching section 72 is provided with threaded holes 72*a*. The attaching section 72 is located on the back side of the liquid crystal display unit and provided with a surface generally parallel to the display face of the liquid crystal display unit.

The angle changing mechanism 70 capable of changing the angle of the display of the liquid crystal panel comprises a hinge mechanism 74 and a mount 76. The hinge mechanism 74 comprises a connecting member 74*a*, a supporting member 74*b*, hinge shafts 74*c* coupling the connecting member 74*a* to supporting member 74*b*. When a force is given to the connecting member 74*a*, the connecting member 74*a* can be rotated with respect to the supporting member 74*b* about the axis of the hinge shafts 74*c*.

The connecting member 74*a* has holes 74*d*. Screws 78 are inserted into the holes 74*d* of the connecting member 74*a* and screwed into the threaded holes 72*a* of the attaching section 72 of the frame 58. In this way, the connecting member 74*a* is fixed to the frame 58. The support member 74*b* has hole 74*e*. The mount 76 has threaded holes corresponding to the holes 74*e* of the support member 74*b*. Screws (not shown) are inserted into the holes 74*e* of the support member 74*b* and screwed into the threaded holes of the mount 76. The cover 80 is attached to the mount 76, covering the screw holes. A cover 80 has openings 80*a* through which the connecting member 74*a* and the supporting member 74*b* are passed.

The mount 76 is set on a desk. A viewer can see a display surface of the liquid crystal display device 50. When the viewer wants to change the angle of the display surface of the liquid crystal panel 54, the liquid crystal display device 50 is adjusted by the viewer. Then, the connecting member 74*a*, along with the liquid crystal display device 50, is rotated with respect to the support member 74*b* and the mount 76 about the axis of the hinge shafts 74*c*. Accordingly, the viewer is capable of changing the angle of the display surface of the liquid crystal panel 54.

According to the present invention, since the angle changing mechanism 70, capable of easily changing the angle of the display of the liquid crystal panel, is provided on the back surface of the liquid crystal display unit 52, it is unnecessary to provide a specific member for attaching the angle changing mechanism 70. Therefore, it is possible to provide a liquid crystal display device having a mechanism capable of changing the angle of the display of the liquid crystal panel, the structure of which is simple.

Figure 18:
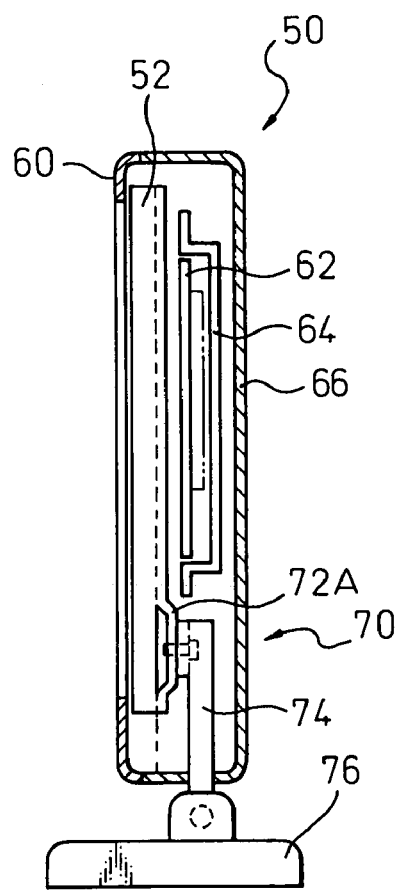
FIG. 18 is a cross-sectional view showing a modification of the liquid crystal display unit shown in FIG. 14.
Figure 19:
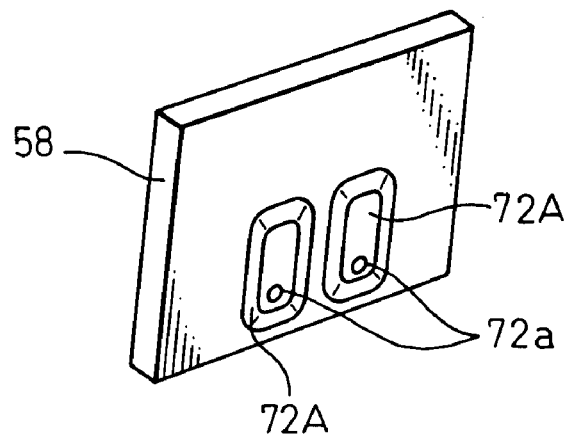
FIG. 19 is a perspective view showing a portion of the frame of the liquid crystal display unit shown in FIG. 18.

FIG. 18 is a cross-sectional view showing a modification of the liquid crystal display device 50 shown in FIG. 14. FIG. 19 is a perspective view showing a portion of the frame 58 of the liquid crystal display device 50 shown in FIG. 18. In this embodiment, the attaching section 72 for attaching the mechanism 70 capable of changing the angle of the display of the liquid crystal panel is arranged in the lower portion of the frame 58 the range where the light source unit 56 exists. FIG. 19 shows the frame 58 having the attaching section 72. The attaching section 72 is formed as walls 72A swelling up from the back surface of the frame 58, so that screws engaging with the threaded holes 72*a* do not interfere with the light source unit 56. In this connection, it should be noted that the position and structure of the attaching section 72 are not limited to the above specific embodiment. Also, it should be noted that the attaching means provided in the attaching section 72 is not limited to screwing, for example, it is possible to attach it by means of an adhesive.

Figure 20:
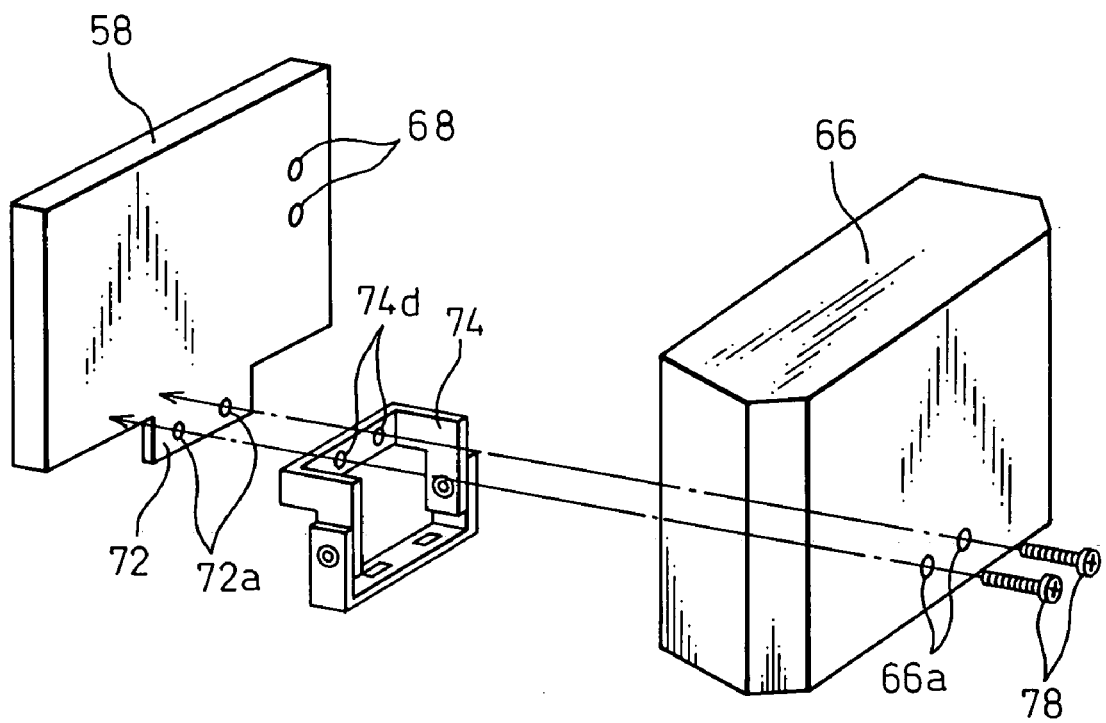
FIG. 20 is an exploded perspective view of a modification of the liquid crystal display device shown in FIG. 14.

FIG. 20 is a cross-sectional view showing a modification of the liquid crystal display device 50 shown in FIG. 14. The structure of this embodiment is substantially the same as that shown in FIGS. 14 and 15. The point of difference is that screws 78 are inserted into holes 66*a* of the rear cover 66 and holes 74*d* of the connecting member 74*a* and screwed into the threaded holes 72*a* of the attaching section 72 of the frame 58.

As explained above, according to the present invention, it is possible to provide a liquid crystal display device having a smaller picture frame region. Further, according to the present invention, it is possible to provide a liquid crystal display device having a mechanism, capable of changing an angle of the display of the liquid crystal panel, the structure of which is simple.

The invention claimed is:

1. A liquid crystal display device, comprising:
   a liquid crystal panel;
   a light source unit;
   a housing;
   a frame in the housing for directly supporting the liquid crystal panel and the light source unit as a liquid crystal display unit, said frame having an outer perimeter bordering said panel, a thickness in a direction parallel to a display surface of said panel, and an attaching section; and
   a hinge mechanism attached to the attaching section of the frame for changing an angle of a display surface of the liquid crystal panel, the hinge mechanism including a supporting member and a connecting member rotatably supported by the supporting member by a hinge shaft, the connecting member being connected to the attaching section,
   wherein said attaching section is a substantially flat plate section that extends outward from a central portion of one side of said frame perimeter in a direction substantially parallel to a plane of said display surface.

2. The liquid crystal display device according to claim 1, further comprising a circuit board for driving the liquid crystal panel, the circuit board being attached to a rear side of the frame.

3. The liquid crystal display device according to claim 2, further comprising a shield cover that covers the circuit board.

4. A liquid crystal display device according to claim 1, wherein the attaching section is provided in a lower extension portion of the frame.

5. A liquid crystal display device according to claim 4,
   wherein the liquid crystal display device is of self-standing type
   comprising a mount for mounting the hinge mechanism and making the liquid crystal panel stand.

6. A liquid crystal display device, comprising:
   a liquid crystal panel;
   a light source unit;
   a housing;
   a frame in the housing for directly supporting the liquid crystal panel and the light source unit as a liquid crystal display unit, said frame having an outer perimeter bordering said panel, a thickness in a direction parallel to a display surface of said panel, and an attaching section; and a hinge mechanism attached to the attaching section of the frame for changing an angle of a display surface of the liquid crystal panel, the hinge mechanism including a supporting member and a connecting member rotatably supported by the supporting member by a hinge shaft, the connecting member being connected to the attaching section, wherein said attaching section is a substantially flat plate parallel to the plane of said display surface, being within the frame perimeter looking perpendicular to said display surface, and located off a rear surface section of said frame outside of a rear boundary of said frame thickness.

7. A liquid crystal display device according to claim 6, wherein the attaching section is provided in a lower extension portion of the frame.

8. A liquid crystal display device according to claim 7, wherein the liquid crystal display device is of self-standing type comprising a mount for mounting the hinge mechanism and making the liquid crystal panel stand.

9. A liquid crystal display device, according to claim 6, wherein:

the hinge mechanism is attached to the frame by a screw;

the attaching section provides a threaded hole for attaching the hinge mechanism by the screw;

the attaching section is in a portion where the light source unit exists; and the attaching section is provided as a wall swelling up from a back surface of the frame so that the screw does not interfere with the light source unit.

* * * * *